June 26, 1951  B. F. DAVIS  2,558,673
HANDLING CHEESE
Filed Aug. 23, 1945
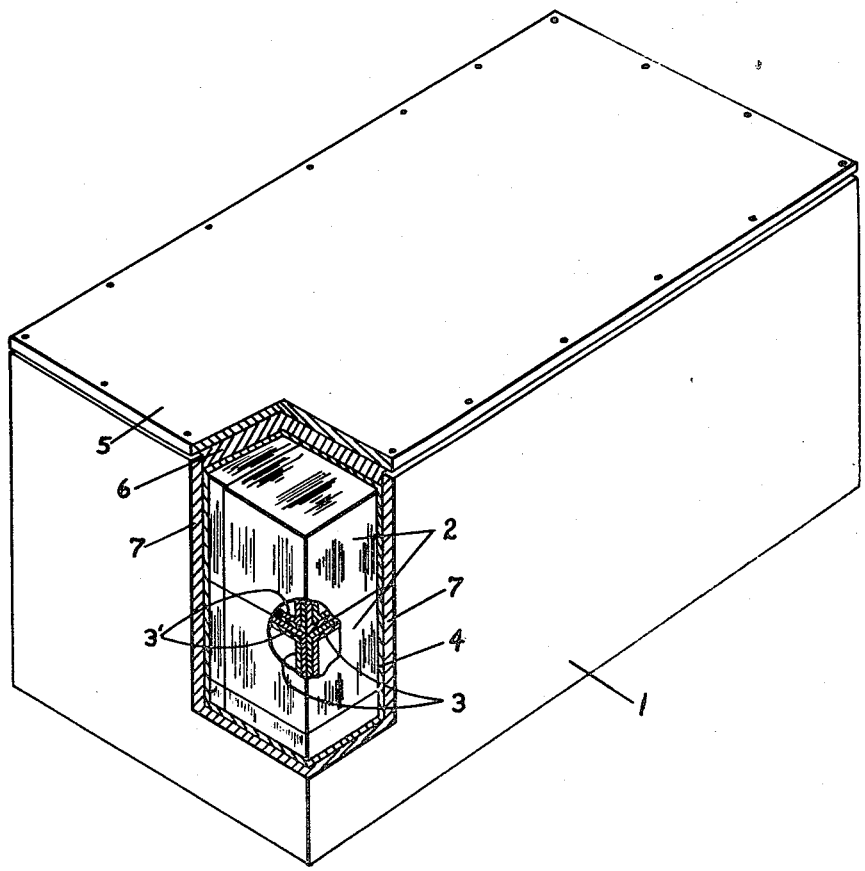
INVENTOR.
BENJAMIN F. DAVIS
BY
R. H. Waters Patented June 26, 1951

2,558,673

UNITED STATES PATENT OFFICE 2,558,673

HANDLING CHEESE

Benjamin F. Davis, Arena, Wis., assignor to Wingfoot Corporation, Akron, Ohio, a corporation of Delaware Substituted for abandoned application Serial No. 469,423, December 18, 1942. This application August 23, 1945, Serial No. 612,178

5 Claims. (Cl. 99—178)

This invention relates to improvements in the art of cheese making and marketing. It includes the process of curing and the process of packaging. It replaces my abandoned application Serial No. 469,423, filed December 18, 1942, which is in part a continuation of my abandoned application Serial No. 417,420, filed November 1, 1940.

In the present methods of curing cheese, there is considerable loss of weight through evaporation of moisture and formation of rind. There is further loss if the cheese becomes moldy. According to the present invention the cheese may be cured without the formation of rind or mold and with no substantial loss in weight.

According to the present invention the cheese is pressure-packed during curing. It may be so packed during only a part of the cure or during the whole curing period. The preliminary stages of the cure may be carried out according to any of the present usual methods, and the cheese may then be pressure-packed for the remainder of the curing period, or the cheese may be pressure-packed immediately after being "closed up" and is then preferably kept in a pressure-packed condition throughout the cure and until it is dispensed to the retail purchaser directly from the container in which it is pressure-packed.

The term "closed up" in the preceding paragraph refers to the healing over or sealing up of the surface of the cheese curd as habitually accomplished in cloth or paper wrappings in cheese hoops under pressure.

The term "pressure-packing" is used herein to refer to the packaging of one or more units of cheese in a container, the wrapper on the cheese, if any, being of such composition as to permit the escape of gases generated during the cure or being so arranged as to permit the escape of such gases, but with the wrapper pressed tight to the cheese and, if a plurality of units are packed in a single container, with the units maintained in such close relation to one another, by subjecting the whole to pressure, that the container as a whole is substantially air-free. This precludes the possibility of mold forming on the cheese, at least to any considerable degree. By wrapping the cheese in a moisture-tight wrapper or using a moisture-tight container, the cheese is prevented from drying out, and this precludes the formation of rind.

The container is preferably a shipping container and may be made of wood or fiberboard. The wrapped units are nested in this, and when filled, the entire contents are subjected to pressure, to remove air. Thereafter the units must be held in contact with one another so that no air enters the package. If the units are packed loosely so that they shift ever so slightly when the package is moved, air is drawn in between the units, and mold will result. The units in the package of this invention are maintained in a pressure-packed condition; i. e., with the entire surface of each wrapped unit continuously pressed against the entire surface of an adjoining unit or a wall of the container so that the package, although gas-emitting, will not breathe, and the cheese is thus kept mold-free.

In carrying out the invention, the cheese units are preferably individually wrapped in a limp, oil-, water-, and air-resisting material. The wrapper is not tightly sealed, but must be left open to permit the escape of gases generated during the cure. The wrapped units are then placed in a container. A wooden container is preferred. A pressure plate is then inserted in the top of the package, and the cover is fastened on. This subjects the contents of the package to pressure and brings the units into intimate contact with one another and squeezes out the air from within the individual units and from between the units. The package is thereafter maintained in this pressure-packed, substantially air-free condition. Any wrapper may be used which flattens out on the application of the pressure employed so that no substantial amount of air is trapped in its folds. It is not essential to use a wrapper, nor is it essential to use a pressure plate, as any means for obtaining pressure may be utilized.

The individual cheese units may be of any desired size as, for example, ½ pound, 1 pound, 2 pounds, or larger, such as 5-, 10-, and 20-pound blocks or larger. The invention is applicable to the treatment of Cheddar or American type cheese or cheese of the type known as Colby cheese or the like. According to this invention the cheese may be pressure-packed before curing, or the package may be formed of cheese which has been partially cured or which embodies an advanced cure. The following is illustrative of the invention:

The cheese, for example, may have been formed into so-called squares after the manner habitually followed in cheese factories making 5-, 10-, and 20-pound "squares" or blocks preparatory to curing on shelves, after dipping in melted paraffin. According to the preferred method of carrying out this invention, the cheese, upon removal from hoops the day following manufacture, is not dried or dipped in paraffin, but after removing the press cloth is immediately wrapped in a sheet of limp film. Metal foil, such as tin foil, may be used where transparency is not desired. Coated sheets may be used. The wax-rubber sheet known as Parafilm (manufactured by Menasha Products Company, of Menasha, Wisconsin) has been used. The preferred film is a thin sheet of rubber hydrochloride film, such, for example, as a sheet which is no more than about .0004 inch thick. Thicker sheets up to those .0006 inch thick or thicker may be used. These thin sheets conform easily to the shape of the cheese block without the formation of "pipes" or loops along the edges, which hold air and cause the formation of mold on the cheese surface. This limp wrapper should be sufficiently resistant to water and oil to prevent its decomposition or solution by the moisture and oil in the cheese. Furthermore, it should not absorb the oil because the absorbed oil tends to become rancid. The wrapper is preferably waterproof so that when the cheese is removed from refrigeration, the moisture which condenses on it does not attack the wrapper or affect its appearance.

The preferred film is a rubber hydrochloride film about .0004 inch thick. Forty-gauge, transparent, tensilized N–1 Pliofilm (manufactured by The Goodyear Tire & Rubber Company) is satisfactory. This film is not sealed airtight around the cheese by heat and pressure or other means. On large units of the cheese overlapping portions of the wrapper may be held in place by means of short strips of adhesive tape applied only as needed to hold the wrapper in place. This permits the expulsion of air when pressure is applied and the escape of any gases which may be generated in the cheese during the curing period. The block thus wrapped, preferably after first overwrapping either with ordinary wrapping paper or preferably with glassine paper, is placed in a well-fitting box, such as a wooden box, which is made to a size which exactly accommodates the wrapped block of cheese. A thin board, which is the area of the inside of the box and serves as a pressure plate, is placed on top of the cheese, and then the cover to the box is fastened on. The thickness of the thin board is such that it fills the box to more than its normal capacity so that the cover must be forced into place. Therefore, when the cover is nailed well in place, the cheese is placed under pressure, and the air is squeezed from the package.

After packaging, the cheese is cured in regular cheese coolers, but before being placed in a cooler, the nailed-up boxes are advantageously held for forty-eight hours in ordinary room temperature, preferably not lower in degree than 70° F. so that the cheese will remain or become plastic and yield to pressure and will fully conform to the shape of the interior of the box. The thin film is thus brought into intimate contact with the surface of the cheese on all sides of the block. This treatment is applicable to a plurality of blocks wrapped individually as well as to single blocks so long as the pressure required to expel the air is arrived at and the final package is maintained in an air-free condition. The cheese may be allowed to cure in regular cheese coolers, and without other attention will develop the cure at a rate in proportion to the temperature at which it is held. Faster cures are possible at higher temperatures and vice versa, but generally a temperature of 45° to 50° F. is satisfactory. No waxing is necessary. Careful preparation of the cheese block within the box with sufficient pressure to expel the air and a construction which prevents breathing without preventing the escape of gas, insure the maintenance of an air-free condition on the cheese surface, and thus the formation of mold is prevented. The use of a moisture-tight wrapper or container prevents loss of moisture and the formation of rind.

The cheese may be kept in the curing coolers for the entire period of cure desired or may be removed from one to another cooler, whether in the same or a distant building, because slight oiling of the surface of cheese, such as is produced by raising the temperature, is generally beneficial, but in the main the cheese should be held under 50° F., which is the requirement for the preservation of all natural types of Cheddar or American or Colby types of cheese during cure and storage until diverted for use or for repackaging. In the case of some coated wrappers which develop "off" flavors when in contact with cheese oil, it may be necessary to prevent oiling by keeping the cheese under refrigeration at all times.

As an alternative procedure, the cheese may be cured to a desired stage of development in a single block and then cut into small blocks or prints. These may be individually wrapped in a thin limp sheet of the type referred to and may be pressure-packed singly or in multiples of individually wrapped blocks for sale to distributors and retail dealers.

This alternative procedure is preferred in serving the retail trade with natural cheese for resale in small units as the quality of the cheese may be known by sampling after curing before going to the expense of wrapping the individual consumer-size prints. In thus preparing a cured cheese of the age type desired for the retail trade, a large block of the cheese as, for instance, a 20-pound block is prepared by removing it from the cooler and storing it in a temperature of 78° to 85° F. for twenty-four hours to render the cheese soft enough to be cut readily into sizes desired by passing cheese-cutting wires through the cheese. The block may have been cured in a pressure-packed condition, or it may have been cured by any other procedure.

A 20-pound block of cheese may be cut into forty ½-pound prints, twenty 1-pound prints, ten 2-pound or four 5-pound prints. It is then preferably wrapped, a thin rubber hydrochloride film about .0004 inch thick being a preferred wrapping material. These small wrapped prints of cheese are then nested in a box, which is preferably a box of size used in curing the original large block of cheese, and they may be returned to the same box from which the cured cheese has been removed. An alternative method would be to assemble one-half of the prints originally cut from a block and, after wrapping, to nest them in a box one-half the size of the one originally used. If a wooden box is used, it is preferably lined with good quality grease-resistant wrapping paper. After the box is filled, the paper lining is folded to completely cover the individually wrapped units. A thin board having the same area as the interior of the box is laid in place on the top of the cheese, and the cover is put in place and nailed down so that the thin board insert or pressure plate places the contents of the box under pressure. If a fiberboard container is used, the paper liner may be dispensed with. A thin fiberboard insert may be used instead of a wooden board to obtain the desired pressure in the box.

It will generally be desirable to overwrap the individual units after first enclosing them in a thin wrapper, and before pressure-packing them. Rubber hydrochloride film about .0008 inch thick is preferred for this purpose. The long seam formed on wrapping may be heat-sealed at several spots, and the folded end of each print may be pressed against a hot plate to hold the wrapper in place without hindering the escape of air and gases. Instead of a complete overwrap, a band of rubber hydrochloride film or other suitable material may be used to cover only four sides of each print. The overwrap may be formed of wax paper, cellophane or the like.

The box can then be marketed to distributor or retailer. Before being returned to regular natural cheese refrigeration for preservation, it should be held in a temperature of 75° to 85° F. for twelve hours to cause the assembled wrapped prints to soften and conform fully to each other and to the inner box surface and thus bring the thin film intimately in contact with all surfaces of the cheese. The boxes may be stacked on one another to produce the pressure required to force out the air between the softened cheese units. If the boxes are stacked to produce the desired pressure, it will, of course, be necessary to weight the top box to place it under the necessary pressure. This warming period is advantageous too in bringing about a slight oiling on the surface of the cheese. This is desirable in this process of packaging because it helps to effect a better adherence of the thin film to the cheese, thus preventing mold growth.

The invention will be further described in connection with the accompanying drawing which illustrates a shipping container which is pressure-packed with a plurality of individually wrapped units of cheese. The container is preferably, although not necessarily, a wooden box. It must be sufficiently rigid to maintain contact with the wrapped cheese which it contains because any flexing of the walls of the container, which causes separation of the limp wrapper from the surface of the cheese blocks, tends to suck air into contact with the cheese, and this is to be avoided.

The drawing shows in perspective a wooden box 1, which is filled with the units of cheese 2, each unit being individually wrapped with a limp wrapper 3 and an overwrap 3', and the whole being enclosed in a liner 4, which may be ordinary wrapping paper or glassine paper. It will be noted that the box comprises two covers; namely, the outer cover 5 and a slip-in cover 6, which fits within the side walls 7. Both tops are made of thin wood. The outer cover 5 need not be a complete cover but may comprise merely a couple of separated boards which extend slightly beyond the edges of the slip-in cover 6 at each end. The slip-in cover 6, which fits down within the side walls of the box, serves to apply pressure to the cheese, and all occluded air is thus driven out of the contents of the box. Also, when the boxes are stacked in storage, the contents are placed under pressure due to the weight of one box on another. Air has been squeezed out of the package, and the contents of the box are substantially air-free in spite of the fact that the walls of the box are pervious to air, and the package is kept in this air-free condition.

The wrapper 3 for the individual cheese units is preferably made of rubber hydrochloride film which is not more than about .0004 or .0005 of an inch thick. This film is made by heating and stretching a standard grade of Pliofilm, such as an unplasticized Pliofilm. This film differs from the cast film which is about .001 of an inch thick or thicker in that the cast film, being thicker, is somewhat stiff and does not drape easily. The stretched film is so thin that it is limp. When laid over a brick of cheese or other object, it conforms to the shape of the object and drapes almost vertically downward around the object. This material is, therefore, ideal for wrapping cheese because it is relatively cheap and, when wrapped around the cheese, conforms readily to the shape of the cheese so that any air included between the cheese and the wrapper can readily be pressed out. When a plurality of packages wrapped in such film are pressed together, they fit snugly to one another, and there is substantially no air remaining between the cheese and the wrapper or between the individual units of the wrapped cheese.

It is not necessary to use rubber hydrochloride film. Other wrappers that are oil-proof, and also preferably waterproof and moisture-proof, can be used, such as metal foil, films of polyvinyl alcohol and other vinyl derivatives, films of rubber and wax composition, etc. The individual wrapped units may be overwrapped, as described, but it is not necessary to use an overwrap. In fact, it is conceivable that a satisfactory package may be developed which without any wrapper maintains the cheese in a satisfactory air-free condition.

The sheet of paper 4 is to protect the thin, limp wrappers on the individual blocks or prints of cheese against puncture in contact with the inside surface of the wooden box. Any paper ordinarily used in packaging may be used. Glassine has proved satisfactory. The units being moisture-tight and maintained in an air-free condition, it is obvious that neither mold nor rind can form.

Although the invention is described more particularly as applied to the prevention of the formation of mold and rind on nested cheese units, it will be obvious that a single block of cheese may be similarly handled to prevent the formation of mold or rind.

The nested cheese units thus packaged may be stored over a considerable period of time and may be displayed by the retailer in the box in which they are stored and may be sold directly from the box. The units are as fresh after storage as before, there being no loss of water and no formation of mold. Each individual unit is free from rind and, for all practical purposes, just as moist as when packaged. The cheese continues to cure or "age" in the package, the rate depending upon the temperature at which it is stored.

The limp Pliofilm wrapper may be printed with the maker's name, etc., or a label giving this information may be included with each unit, and the small units may be sold directly from the box 1 without further wrapping. There may be overwrapped with ordinary wrapping paper at the time of sale if desired.

Although the invention is applicable to the packaging of small blocks and prints and slices of cheese cut from a larger, cured block, the invention also has application to the curing of whole cheeses, such as American, Cheddar cheese, Colby cheese, and the like. It is also applicable to the packaging of cheese which has been ground and blended and pressed into a block. The cheese may be pressure-packed throughout the whole of the cure or through only a part of it.

What I claim is:

1. The method of treating cheese in a container which comprises wrapping a block of Cheddar-type cheese curd in an air-impervious oil-resistant moistureproof wrapper which permits the escape of gases generated by the cheese on curing, subjecting the wrapped curd to pressure in its curing container to squeeze out air between the wrapper and the surface of the curd and by pressure maintaining the wrapper in contact with the entire surface of the curd while partial curing takes place, then removing the wrapper, dividing the cheese into a plurality of smaller units, individually wrapping each such unit with a moistureproof wrapper which permits the escape of gases, and pressing the wrapper into intimate contact with the entire surface of the cheese unit in a container and by pressure maintaining it in contact with the entire surface of the cheese during subsequent curing.

2. The method of treating cheese which comprises wrapping a block of Cheddar-type cheese curd in an air-impervious, oil-resistant and moistureproof wrapper which under pressure conforms to the shape of the cheese and which permits the escape of gases generated by the cheese in curing, subjecting the wrapped curd to pressure in its curing container to squeeze out all air from the container and maintaining the entire surface of the curd in contact with the wrapper while partial curing takes place, then removing the wrapper, dividing the cheese into a plurality of smaller units, individually wrapping each unit with an air-impervious, oil-resistant and moistureproof wrapper which under pressure conforms to the shape of the cheese and which permits the escape of gases, and pressing each wrapper into contact with the entire surface of each cheese unit while in the container, and maintaining the entire surface of the cheese in contact with the wrapper by pressure during subsequent curing and until marketed.

3. The method of curing cheese which comprises enclosing a Cheddar-type cheese curd in an unsealed, limp, air-impervious oil-resistant wrapper, placing the wrapped curd in a container and applying pressure thereto and maintaining pressure on the curd at about room temperature until the shape of the curd conforms to the interior of the container and the wrapper is brought into contact with the entire surface of the curd, and curing the cheese thereafter at reduced temperature while maintaining pressure on the wrapped cheese to keep the wrapper in contact with the entire surface of the cheese.

4. The step in the processing of cheese which comprises individually wrapping a plurality of units of rindless Cheddar-type cheese, which is at least partially cured, in unsealed, air-impervious limp, oil-resistant wrappers, putting the wrapped units in a container and placing them under pressure therein and maintaining them under pressure at about room temperature until the shape of the units as a whole conforms to the interior of the container and the wrappers on the individual units are brought into contact with the entire surface of each unit and until a thin layer of oil exudes onto the surface of each unit, and thereafter lowering the temperature of the cheese and completing the cure while maintaining the cheese under pressure and keeping the wrappers of the individual units in contact with the entire surface of each unit.

5. The method of treating cheese which comprises enclosing a block of Cheddar-type cheese curd in a thin, limp, air-impervious oil-resistant wrapper which conforms to the shape of the cheese and which permits the escape of gases generated by the cheese in curing, subjecting the wrapped curd to pressure in its curing container to squeeze out all air from the container, and maintaining the entire surface of the curd in contact with the wrapper while at least partial curing takes place, then removing the wrapper, dividing the cheese into a plurality of smaller units, individually wrapping each unit at least with a limp wrapper which conforms to the shape of the cheese and which permits the escape of gases, and pressing it into contact with the entire surface of the cheese unit while in a container, and maintaining it in contact with the entire surface of the cheese by pressure until marketed.

BENJAMIN F. DAVIS.

REFERENCES CITED

The following references are of record in the file of this patent:

UNITED STATES PATENTS

| Number | Name | Date |
|---|---|---|
| 1,400,171 | Kraft | Dec. 13, 1921 |
| 1,415,943 | Meyers | May 16, 1922 |
| 1,925,443 | Gere | Sept. 5, 1933 |
| 1,992,821 | Gere | Feb. 26, 1935 |
| 2,077,300 | Abrams | Apr. 13, 1937 |